UNITED STATES PATENT OFFICE.

JOSEPH B. MURRAY, OF BROOKLYN, NEW YORK.

PROCESS OF ELECTRIC WELDING.

1,278,193.  Specification of Letters Patent.  Patented Sept. 10, 1918.

No Drawing.  Application filed March 22, 1918. Serial No. 223,932.

*To all whom it may concern:*

Be it known that I, JOSEPH B. MURRAY, a citizen of the United States, residing at Brooklyn, in the county of Kings and State of New York, have invented a certain new and useful Improvement in Processes of Electric Welding, of which the following is a specification.

My invention is a process of electric welding.

When two bodies are to be electrically welded, they are placed in contact, and the welding current is established through the joint until the metal of the opposing surfaces becomes weldable—that is, soft or plastic enough to cause the adhesion of one body to the other. Pressure is also applied, but usually no more than is sufficient to facilitate the adhesion. As soon as this is apparently accomplished, the united bodies are removed from the welding apparatus and left to cool. In other words, no pressure is applied during the cooling. As a necessary consequence, the structural change taking place on passing the critical temperature during the heating, and but slightly modified by the pressure employed, begins again, and finally becomes permanent. The grain of the metal at the joint is thus rendered coarse, and the mass brittle, and so stays; or, in other words, the relation between the physical condition of the metal at the joint and the metal of the bodies elsewhere is analogous to that of cast iron to wrought iron. Therefore, the strength at the joint is less than at elsewhere, and the joint is liable to break under shock or strain. This, in my belief, accounts for failures of electrically welded joints hitherto unexplained; and in fact it was in view of this difficulty that I was led to undertake the investigation of the problem involved, of which my present invention is a solution.

All that is necessary is to leave the welded bodies in the welding electrodes, after the weld has been made, the current being shut off, and the pressure continued, until on cooling their temperature falls below the critical temperature above referred to. This is easily ascertained by any suitable pyrometric means applied to the united bodies. The result is that the welded metal at the joint instead of being weaker is in some degree stronger than the metal elsewhere, and the before-mentioned difficulty is, therefore, eliminated.

As the temperature of change of the structure of the metal during heating may range between certain limits and is not confined to some precise thermometric degree, it is to be understood that the term "critical temperature", as herein set forth, includes not only a single precise degree, but all degrees between said certain limits, and that, in the latter instance, cooling below the critical temperature means cooling below the lower limit.

I claim:

The method of electrical welding, which consists in electrically heating the bodies to be welded to a welding temperature while subjecting them to pressure, then discontinuing the welding current, and then allowing said objects to cool, while maintaining said pressure until after the critical temperature of structural change hereinbefore set forth has been passed.

In testimony whereof I have affixed my signature in presence of two witnesses.

JOSEPH B. MURRAY.

Witnesses:
GERTRUDE T. PORTER,
MAY T. McGARRY.